June 16, 1942. W. W. SLOANE Re. 22,121

DRIVE MECHANISM FOR SHAKER CONVEYERS

Original Filed Jan. 15, 1934 3 Sheets-Sheet 1

Inventor
William W. Sloane
Clarence F. Poole
Attorney

June 16, 1942. W. W. SLOANE Re. 22,121

DRIVE MECHANISM FOR SHAKER CONVEYERS

Original Filed Jan. 15, 1934 3 Sheets-Sheet 2

Inventor
William W. Sloane
Clarence F. Poole
Attorney

June 16, 1942. W. W. SLOANE Re. 22,121

DRIVE MECHANISM FOR SHAKER CONVEYERS

Original Filed Jan. 15, 1934 3 Sheets-Sheet 3

Inventor
William W. Sloane
Clarence F. Poole
Attorney

Reissued June 16, 1942 Re. 22,121

UNITED STATES PATENT OFFICE 22,121

DRIVE MECHANISM FOR SHAKER CONVEYERS

William W. Sloane, Chicago, Ill., assignor to Goodman Manufacturing Company, Chicago, Ill., a corporation of Illinois Original No. 2,077,811, dated April 20, 1937, Serial No. 706,787, January 15, 1934. Renewed October 28, 1935. Application for reissue April 15, 1942, Serial No. 439,140

30 Claims. (Cl. 198—220)

This invention relates to improvements in drive mechanisms for shaker conveyers of the type utilized for conveying loose material, such as coal.

My invention has as one of its principal objects to provide a new and improved mechanical movement for a drive of the character described, whereby a gear reduction device, such as a planetary, is interposed between a drive motor and the shaker conveyer trough or pan line and arranged in a new and novel manner to transpose the rotary motion of the motor into a rectilinear motion, having predetermined changes in acceleration during various parts of the stroke, so as to produce a most efficient conveying action for a maximum driving force, for moving material in one direction along the conveyer trough or pan line. Another object of my invention is to provide a drive which is so constructed that the motion imparted to the pan line may readily be changed to prevent excessive strains on the drive as the length of the pan line is increased.

My invention may more clearly be understood with reference to the accompanying drawings wherein.

Like reference characters refer to like parts throughout the various figures.

Figure 1:
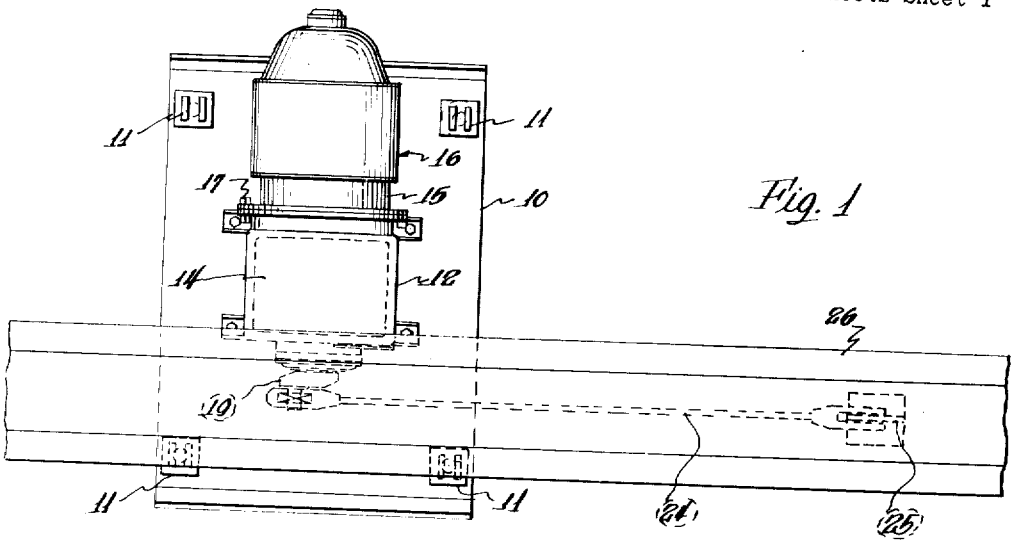
Figure 1 is a top plan view of a device embodying the invention operatively connected with a conveyer trough or pan line.
Figure 2:
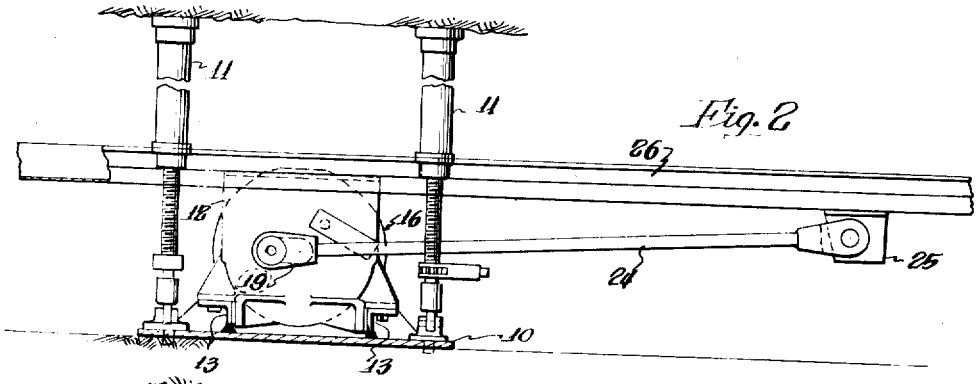
Figure 2 is an end view of the device shown in Figure 1.
Figure 3:
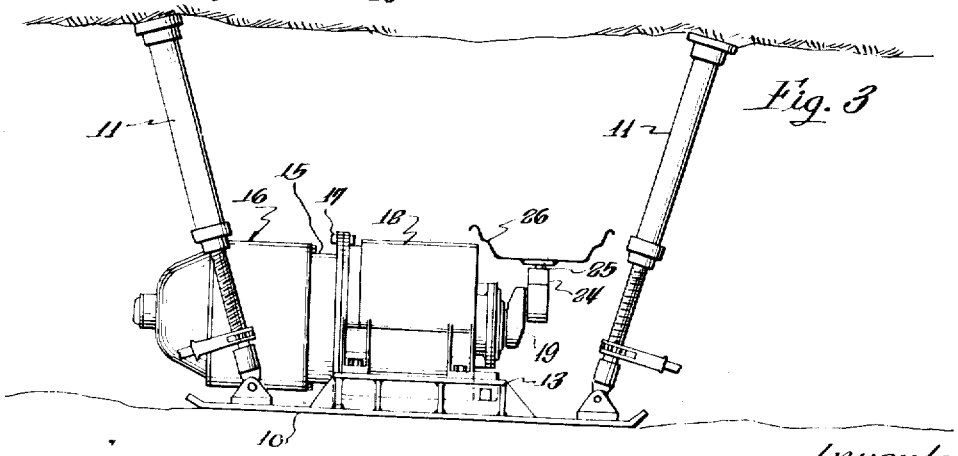
Figure 3 is a side elevation of the device shown in Figure 1.
Figure 4:
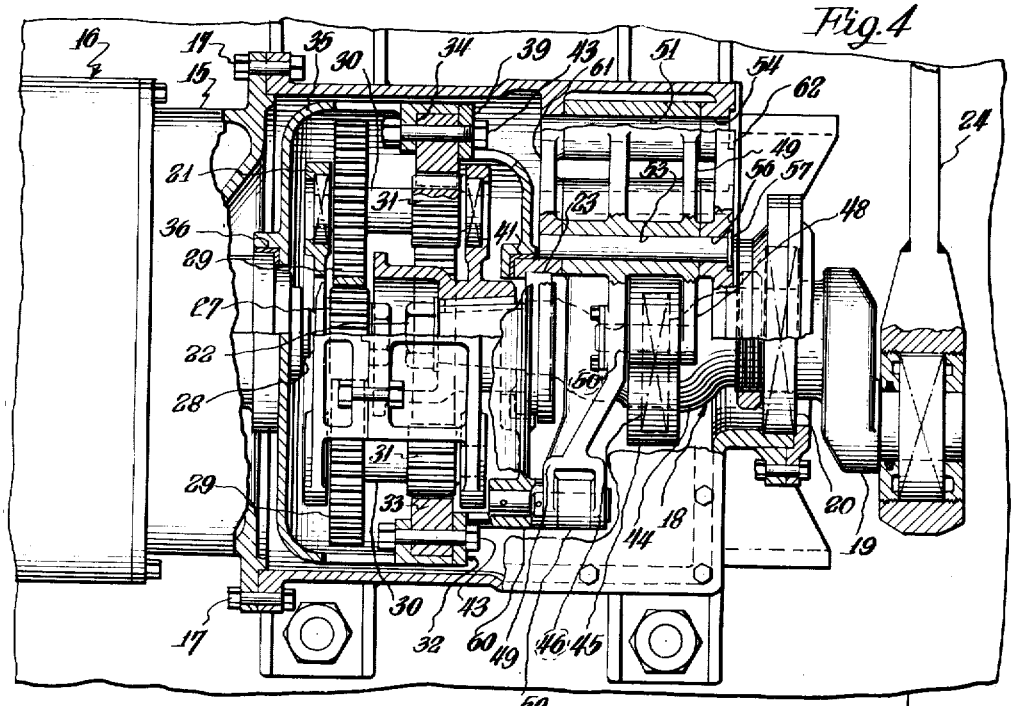
Figure 4 is an enlarged plan view of the drive mechanism with a portion of the gear cover removed and with parts broken away and shown in horizontal section to more clearly illustrate certain details of the invention.
Figure 5:
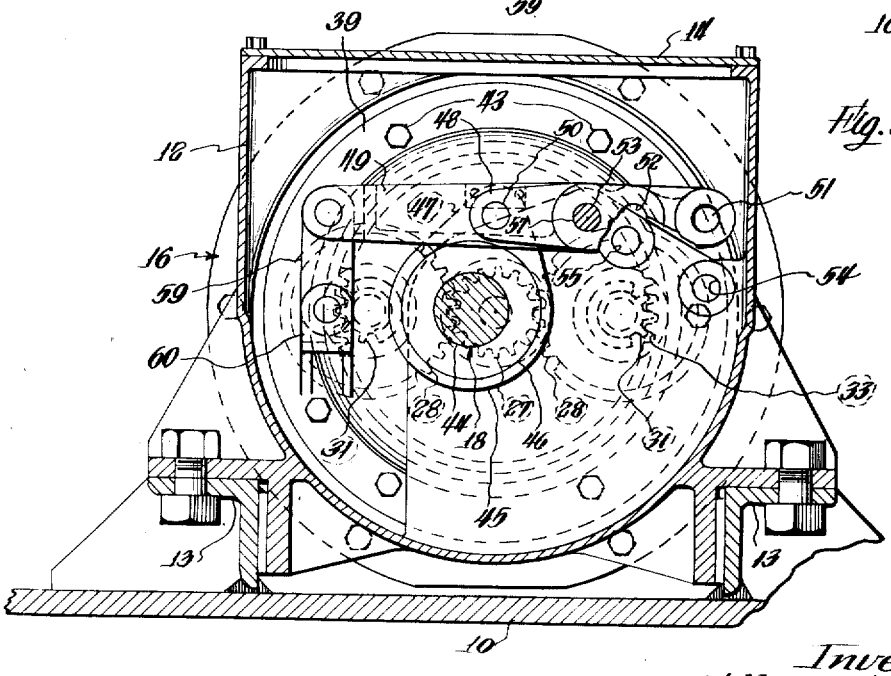
Figure 5 is an end view of the device shown in Figure 4 with parts broken away and shown in vertical section to illustrate certain details of the invention, not shown in Figure 4.
Figure 6:
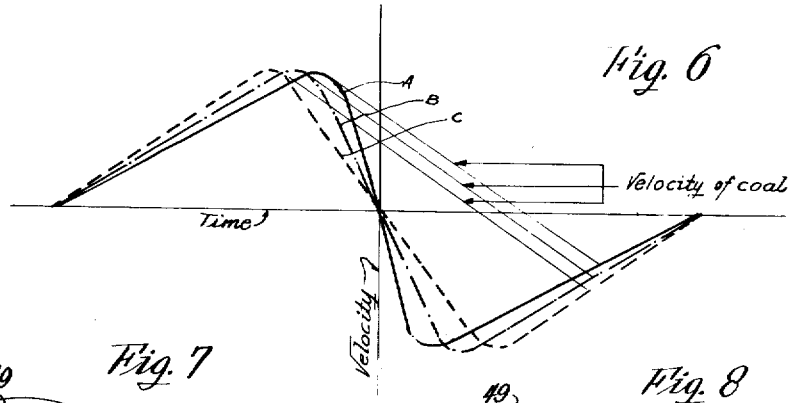
Figure 6 is a diagrammatic view of hypothetical velocity curves of shaker motions for various maximum stresses on the drive mechanism.
Figure 7:
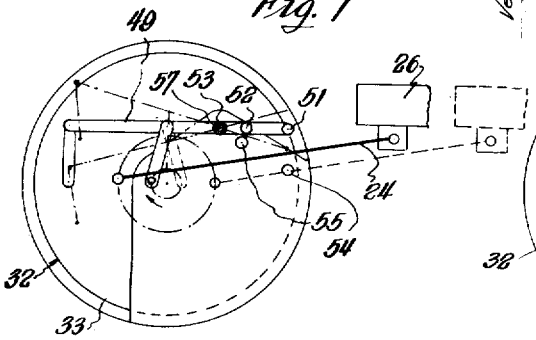
Figures 7, 8 and 9 are diagrammatic views showing various arrangements of mechanisms for effecting different shaker motions for different lengths or weights of pan lines.

With reference now to the details shown in the drawings illustrating one embodiment of my invention, a base plate 10 is provided. The base plate 10 may be of a more or less flexible character to conform to a mine bottom which is slightly uneven and may be held in position on the bottom by means of a plurality of adjustable screw jacks 11, 11 in the usual manner, one of said jacks being disposed adjacent each corner of said base plate. A casing 12 is secured to the horizontal legs of angles 13, 13, which angles are in turn secured to the base plate 10 in a suitable manner; such as welding. The casing 12 is provided with a removable cover 14, and is adapted to have an end plate 15 of a motor 16 secured to one of its ends in a suitable manner; such as, nuts and bolts 17, 17, as is clearly illustrated in Figure 4.

The casing 12 forms a housing and bearing supporting means for the conveyer drive mechanism which includes a shaft 18 having a crank 19 projecting from said casing and formed on the outer end of said shaft. The shaft 18 is journaled adjacent the crank 19 in a suitable bearing 20 carried in the outer end of the casing 12. The inner end of the shaft 18 is tapered and has a cage 21 keyed thereto and held thereto by means of a nut and washer 22 and is journaled within the casing 12 adjacent the inner side of said cage by means of a suitable bearing 23. A connecting rod 24 is journaled on the crank 19 adjacent one of its ends and is pivotally connected to a depending tongue 25 of a conveyer trough 26 adjacent its opposite end. It should herein be noted that the connecting rod 24 is relatively long to reduce angularity of said connecting rod as much as possible, and to prevent fluctuations of the motion of the pan line from the theoretically correct motion, which fluctuations may be caused by angularity of said connecting rod.

With reference now in particular to the means for driving the crank 19 and imparting a gradually accelerated motion to the conveyer trough 26 for a greater portion of the length of its forward stroke and a rapidly decelerated motion to said conveyer trough for the remainder of its forward stroke, together with a rapidly accelerated motion to said conveyer trough for a short portion of its return stroke and a gradually decelerated motion to said conveyer trough for the remainder of its return stroke, a planetary geared reduction device having a movable reaction member is provided for this purpose. The planetary geared reduction device, as herein shown, includes a sun pinion 27 secured to the forward end of a shaft 28 of the motor 16. The sun pinion 27 meshes with and drives planetary gears 29, 29. The planetary gears 29, 29 are secured to parallel spaced shafts 30, 30, which shafts are journaled adjacent their ends in suitable bearing members carried by the cage 21. Planetary pinions 31, 31 of smaller diameter than the planetary gears 29, 29 are secured to the shafts 30, 30 and rotated thereby and engage a suitable reaction member 32. The reaction member 32 includes an internal gear 33, which abuts a shouldered portion 34 of a rotatable support member 35, which support member extends over and surrounds the planetary gears 29, 29 and is journaled on a shouldered bearing member 36 secured to a portion of the end plate 15 of the motor 16. The opposite face of the internal gear 33 is abutted by a flat face of a spider 39, journaled within the casing 12 on a shouldered bearing member 41 in a suitable manner. The support member 35 and spider 39 may be secured to the internal gear 33 in any suitable manner, as, for instance, nuts and bolts, indicated at 43.

It is thus apparent that upon rotation of the sun pinion 27 the cage 21 will tend to rotate within the internal gear 33 when said internal gear is held from movement. When the reaction member 32 and internal gear 33 are permitted to move in the direction of rotation of the cage 21, the speed of rotation of said cage will be increased, and in a like manner when the internal gear 33 is rotated in an opposite direction, the speed of rotation of said cage will be decreased.

Referring now in particular to another of the novel features of my invention and the means for reciprocally pivotally moving the internal gear 33 alternately in opposite directions during each revolution of the crank 19 to provide a gradually accelerated motion to the pan line or trough 26 for a greater portion of its forward stroke, a rapidly decelerated motion to said pan line for the remainder of its forward stroke together with a rapidly accelerated motion to said trough or pan line for a short portion of its return stroke and a gradually decelerated motion to said trough or pan line for the remainder of its return stroke in order that material may be conveyed along the trough or pan line 26 in the most efficient manner possible commensurate with safe stresses on the conveyer drive mechanism, a crank 44 is formed intermediate the ends of the shaft 18. The crank 44 has a connecting member 45 journaled thereon by means of a bearing member 46. The connecting member 45 is pivotally connected between the prongs of a forked portion 48 of a rocking member or arm 49 by means of a pivotal pin 50.

It should be noted that the crank 44 is so located that its dead center position is out of phase with the dead center position of the crank 19 a certain distance, which distance is herein preferably shown as being approximately ninety degrees. The purpose in so positioning the crank 44 with respect to the crank 19 is to cause the corrective effect to the motion of the crank 19 to occur at the proper time in order to change the drive motion of the connecting rod 24 in the proper manner and impart the desired conveying action to the trough 26.

The rocking arm 49 is provided with a plurality of apertures therein, which are indicated by reference characters 51, 52 and 53 and are shown as being spaced inwardly from one end of said lever arm in the order enumerated. A plurality of apertures 54, 55 and 56, corresponding to the apertures 51, 52 and 53 respectively, are provided in spaced walls 61 and 62 of the casing 12. The apertures 54 are adapted to register with the aperture 51 and have a suitable pin 57 inserted therein for providing a fixed fulcrum point for the lever arm 49. When the pin 57 has been removed from the apertures 54 and 51, the aperture 52 may register with the apertures 55 and have the pin 57 inserted therein to provide another fixed fulcrum point for the rocking arm 49, and in a similar manner the aperture 53 may register with the apertures 56 and have the pin 57 inserted therein for providing a third fixed fulcrum point for the rocking arm 49. Each change of the fulcrum point of the rocking arm 49 causes the drive motion of the conveyer trough or pan line 26 to differ in a manner which will hereinafter more fully appear, to prevent an increase in stresses of the drive mechanism as the length of the pan line is increased.

A link 59 is pivotally connected to the opposite end of the rocking arm 49 adjacent one of its ends and the opposite end of said link is pivotally connected to a lug 60 formed on the spider 39. It is thus apparent that upon rotation of the shaft 18 the crank 44 and connecting member 45 will pivotally move the rocking arm 49 about the axis of the pin 57, which in turn will pivotally move the reaction member 32 in opposite angular directions during each revolution of the crank 19. Movement of the reaction member 32 in opposite angular directions in turn will slow down and speed up rotatable movement of the cage 21 and shaft 18 and impart a variable speed of rotation to said shaft in such a manner as to impart the desired conveying movement to the conveyer trough 26.

It should herein be understood that when the reaction member 32 is held from movement, the movement of the conveyer trough 26 is such that its velocity curve is substantially a sine curve. Thus, the acceleration and deceleration of the trough 26 for the forward stroke is substantially the same and reciprocation of said trough will not move material therealong when level. As the reaction member 32 is moved in opposite directions during each revolution of the crank 19, the velocity curve changes and the acceleration and deceleration of the forward stroke of the trough 26 becomes unequal. The greater the movement of the reaction member 32, the steeper will be the line indicating the deceleration of the forward stroke and the more rapid will be the reversal of the drive at the end of the forward stroke, with the resultant increase in coal travel. It may thus be seen that the device of my invention may be so arranged that an infinite number of speeds of coal travel may be obtained to take care of various trough lengths and mining conditions.

It should also be noted that the crank 44 which modifies the movement of the crank 19 is driven from a member which has its own movement modified, which member is herein shown as being the shaft 18 which drives the crank 19. Thus the modifying effect of the crank 44 is built up and is more pronounced than if said crank were driven from a member having a uniform speed of rotation.

With reference now in particular to Figures 6, 7, 8 and 9, Figure 7 shows the movement of the rocking arm 49 and reaction member 32 when the pin 57 is registered with the apertures 53 and 56. When the pin 57 is so positioned, movement of the rocking arm 49 about the axis of said pin effected by the crank 44 and connecting member 45 pivotally moves the reaction member 32, so that the crank 19 is accelerated and decelerated during each revolution thereof in such a manner as to change the acceleration and deceleration of the pan line or conveyer trough 26 during various parts of the stroke so that the velocity curve of said trough approaches the curve indicated by line A in Figure 6. It should be noted that this line indicates that the acceleration of the trough 26 for a greater portion of the forward stroke is gradual, while the deceleration of said trough for the remainder of the forward stroke is rapid. This rapid deceleration, together with the relatively rapid reversal in direction of travel of the pan line, imparts a relatively high rate of travel to the coal in the pan line, but also imparts relatively high stresses to the conveyer drive mechanism where the length of the pan line is over a predetermined length and weight.

Figure 8:
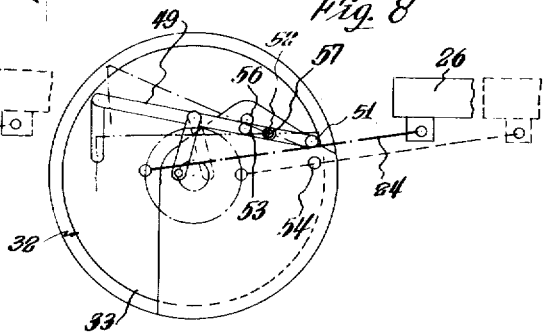

In Figure 8, the fulcrum point of the rocking arm 49 is shown as being moved closer to its end opposite its point of connection with the reaction member 32 and the pin 57 is shown as registering with the apertures 55 and 52 with the result that movement of the reaction member or internal gear 33 is decreased. This increases the rate of acceleration of the forward stroke of the conveyer trough 26 a slight degree over that shown by curve A, as is shown by curve B in Figure 6, but decreases the rate of deceleration of the forward stroke, with the result that the rate of reversal from the forward to return stroke is less violent than that shown by curve A. The result is that the coal travel is slowed down, but the stresses on the drive mechanism are correspondingly reduced so that the motion illustrated by Figure 8 may take care of a heavier and longer pan line than the motion shown by curve A, with the same stresses on the drive mechanism, the length of which pan line may be approximately one and one-half times as long as the pan line which the motion illustrated in Figure 7 and curve A may safely drive.

Figure 9:
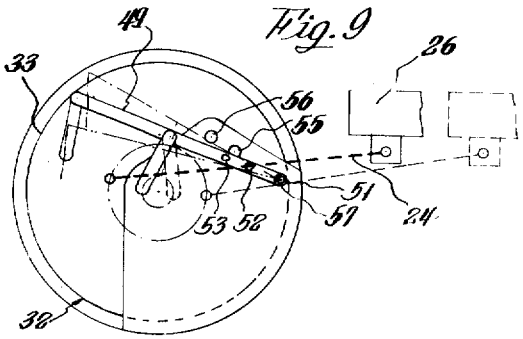

As shown in Figure 9, the fulcrum point of the rocking arm 49 has been moved to a point adjacent its end and the pin 57 registers with the apertures 51 and 54. This results in a decrease in movement of the reaction member 32 and a decrease in coal travel and stresses on the conveyer drive mechanism, as is indicated by curve C in Figure 6. When so adjusted, the stresses on the drive mechanism are such that said drive mechanism may take care of a pan line of a length of approximately twice the length that the motion indicated by curve A may safely drive, and the stresses on the drive mechanism will be no greater than with a short or relatively light pan line driven by the motion illustrated by curve A.

It may now be seen that a new and improved drive mechanism for a shaker conveyer has been provided which is of a novel and compact construction and is so arranged as to impart the desired conveying action to the pan line in a simple, efficient and novel manner and that this drive mechanism may readily be adjusted to take care of varying lengths of pan line without increasing the stresses thereon beyond a safe value, and still maintain an efficient drive which will convey coal in the most efficient manner possible commensurate with safe stresses on the drive mechanism.

While I have herein shown and described one form in which my invention may be embodied, it will be understood that the arrangement of the various parts and the construction thereof may be altered without departing from the spirit and scope thereof. Furthermore, I do not wish to be construed as limiting my invention to the specific embodiment illustrated, excepting as it may be limited by the appended claims.

I claim as my invention:

1. In a shaker conveyer operating mechanism, a rotatable member, a drive member reciprocated thereby and operatively connected with a conveyer trough for reciprocably driving said conveyer trough, and means for driving said rotatable member at a variable angular velocity for driving said conveyer trough in such a manner as to move material therealong, comprising a reaction member, a driven member having operative engagement therewith, a drive connection from said driven member to said rotatable member, and a connection to said reaction member for moving said reaction member in opposite directions during each revolution of said rotatable member.

2. In a shaker conveyer operating mechanism, a rotatable member, a drive member reciprocated thereby and operatively connected with a conveyer trough for reciprocably driving said conveyer trough, and means for driving said rotatable member at a variable angular velocity for driving said conveyer trough in such a manner as to move material therealong, comprising a reaction member, a driven member having operative engagement therewith, a drive connection from said driven member to said rotatable member, and a connection to said reaction member for reciprocably moving said reaction member during each revolution of said rotatable member including a crank and a connection from said crank to said reaction member.

3. In a shaker conveyer operating mechanism, a rotatable member, a drive member reciprocated thereby and operatively connected with a conveyer trough for reciprocably driving said conveyer trough, and means for driving said rotatable member at a variable angular velocity for driving said conveyer trough in such a manner as to move material therealong, comprising a reaction member, a driven member having operative engagement therewith, a drive connection from said driven member to said rotatable member, and a connection to said reaction member for reciprocably moving said reaction member during each revolution of said rotatable member including a crank and a rocking arm connected between said crank and reaction member and fulcrumed for pivotal movement about a fixed pivotal axis.

4. In a shaker conveyer operating mechanism, a rotatable member, a drive member reciprocated thereby and operatively connected with a conveyer trough for reciprocably driving said conveyer trough, and means for driving said rotatable member at a variable angular velocity for driving said conveyer trough in such a manner as to move material therealong, comprising a reaction member, a driven member having operative engagement therewith, a drive connection from said driven member to said rotatable member, and a connection to said reaction member for moving said reaction member in opposite directions during each revolution of said rotatable member including a crank, a rocking arm connected between said crank and reaction member and fulcrumed for pivotal movement about a fixed pivotal axis, and means for changing the movement of said drive member and the conveying action of said conveyer trough comprising means permitting the fulcrum point of said rocking arm to be changed.

5. In a shaker conveyer drive, a reciprocably driven member, means for imparting a gradually accelerated and rapidly decelerated forward stroke and a rapidly accelerated and gradually decelerated return stroke to said reciprocably driven member including a motor, planetary pinions driven thereby, a reaction member engaging said planetary pinions, a cage rotated by said planetary pinions, a drive connection from said cage to said reciprocably driven member and means for moving said reaction member in opposite directions during each revolution of said cage.

6. In a shaker conveyer drive, a reciprocably driven member, means for imparting a gradually accelerated and rapidly decelerated forward stroke and a rapidly accelerated and gradually decelerated return stroke to said reciprocably driven member including a motor, planetary pinions driven thereby, a reaction member engaging said planetary pinions, a cage rotated by said planetary pinions, a drive connection from said cage to said reciprocably driven member and means for moving said reaction member in opposite directions during each revolution of said cage comprising a crank driven by said cage and an operative connection between said crank and reaction member.

7. In a shaker conveyer drive, a reciprocably driven member, means for imparting a gradually accelerated and rapidly decelerated forward stroke and a rapidly accelerated and gradually decelerated return stroke to said reciprocably driven member including a motor, planetary pinions driven thereby, a reaction member engaging said planetary pinions, a cage rotated by said planetary pinions, a drive connection from said cage to said reciprocably driven member and means for moving said reaction member in opposite directions during each revolution of said cage comprising a crank driven by said cage and an operative connection between said crank and reaction member comprising a rocking arm having connection with said reaction member and pivoted for movement about a fixed fulcrum.

8. In a shaker conveyer drive, a reciprocably driven member, means for imparting a gradually accelerated and rapidly decelerated forward stroke and a rapidly accelerated and gradually decelerated return stroke to said reciprocably driven member including a motor, planetary pinions driven thereby, a reaction member engaging said planetary pinions, a cage rotated by said planetary pinions, a drive connection from said cage to said reciprocably driven member and means for moving said reaction member in opposite directions during each revolution of said cage comprising a crank driven by said cage and an operative connection between said crank and reaction member comprising a rocking arm having connection with said reaction member and pivoted for movement about a fixed fulcrum, and means for changing the conveying movement of said reciprocably driven member comprising means permitting the fulcrum point of said rocking arm to be changed.

9. In a shaker conveyer drive, a motor, a reciprocably driven member including a conveyer trough, a crank, a drive connection between said crank and trough, and means for rotating said crank and reciprocably moving said trough in such a manner as to convey material therealong comprising a drive connection from said motor to said crank including a planetary gear reduction device, said planetary gear reduction device including a reaction member, and means for intermittently pivotally moving said reaction member in a direction opposite to the direction of rotation of said crank.

10. In a shaker conveyer drive, a motor, a reciprocably driven member including a conveyer trough, a crank, a drive connection between said crank and trough, and means for rotating said crank and reciprocably moving said trough in such a manner as to convey material therealong comprising a drive connection from said motor to said crank, including a planetary gear reduction device, said planetary gear reduction device including a reaction member, and means for intermittently pivotally moving said reaction member in opposite directions during each revolution of said crank.

11. In a shaker conveyer drive, a motor, a reciprocably driven member including a conveyer trough, a crank, a drive connection between said crank and trough, and means for rotating said crank and reciprocably moving said trough in such a manner as to convey material therealong, comprising a drive connection from said motor to said crank including a planetary gear reduction device, said planetary gear reduction device including a reaction member, and means for intermittently pivotally moving said reaction member in opposite directions during each revolution of said crank comprising a reciprocably movable member reciprocably driven by said planetary gear reduction device and having operative connection with said reaction member.

12. In a shaker conveyer drive, a motor, a reciprocably driven member including a conveyer trough, a crank, a drive connection between said crank and trough, and means for rotating said crank and reciprocably moving said trough in such a manner as to convey material therealong comprising a drive connection from said motor to said crank including a planetary gear reduction device, said planetary gear reduction device including a reaction member, and means for intermittently pivotally moving said reaction member in opposite directions during each revolution of said crank comprising a rocking arm pivotally moved by said planetary gear reduction device and having operative connection with said reaction member.

13. A shaker conveyer drive in accordance with claim 12, wherein the conveying action of said conveyer trough may be changed by changing the axis of pivotal movement of said rocking arm.

14. In a shaker conveyer operating mechanism, a rotatable crank, a drive member operatively connected thereto and reciprocated thereby, and means for variably rotating said crank in such a manner that said drive member may be gradually accelerated for the greater portion of its forward stroke and rapidly decelerated for the remainder of its forward stroke comprising a gear, a pinion meshing with said gear, a cage carrying said pinion and rotated thereby and means for pivotally moving said gear in one direction during a portion of the forward stroke and in an opposite direction during the remainder of the forward stroke.

15. In a shaker conveyer operating mechanism, a rotatable crank, a drive member operatively connected thereto and reciprocated thereby, and means for variably rotating said crank in such a manner that said drive member may be gradually accelerated for the greater portion of its forward stroke and rapidly decelerated for the remainder of its forward stroke comprising a gear, a pinion meshing with said gear, a cage carrying said pinion and rotated thereby and means for pivotally moving said gear in one direction during a portion of the forward stroke and in an opposite direction during the remainder of the forward stroke, comprising a crank having connection with said gear.

16. In a shaker conveyer operating mechanism, a rotatable crank, a drive member operatively connected thereto and reciprocated thereby, and means for variably rotating said crank in such a manner that said drive member may be gradually accelerated for the greater portion of its forward stroke and rapidly decelerated for the remainder of its forward stroke comprising a gear, a pinion meshing with said gear, a cage carrying said pinion and rotated thereby, and means for pivotally moving said gear in one direction during a portion of the forward stroke and in an opposite direction during the remainder of the forward stroke, comprising a crank, a rocking arm having connection with said gear, and an operative connection between said crank and rocking arm.

17. In a shaker conveyer operating mechanism, a rotatable crank, a drive member operatively connected thereto and reciprocated thereby, and means for variably rotating said crank in such a manner that said drive member may be gradually accelerated for a greater portion of its forward stroke and rapidly decelerated for the remainder of its forward stroke comprising a gear, a pinion meshing with said gear, a cage carrying said pinion and rotated thereby and means for pivotally moving said gear in one direction during a portion of the forward stroke and in an opposite direction during the remainder of the forward stroke, comprising a crank, a rocking arm, a connection between said rocking arm and crank, another connection between said rocking arm and gear, said rocking arm having a fixed fulcrum point spaced on the opposite side of the point of connection of said crank to said rocking arm from the point of pivotal connection of said crank to said gear.

18. In a shaker conveyer operating mechanism, a rotatable crank, a drive member operatively connected thereto and reciprocated thereby, and means for variably rotating said crank in such a manner that said drive member may be gradually accelerated for a greater portion of its forward stroke and rapidly decelerated for the remainder of its forward stroke comprising a gear, a pinion meshing with said gear, a cage carrying said pinion and rotated thereby and means for pivotally moving said gear in one direction during a portion of the forward stroke and in an opposite direction during the remainder of the forward stroke, comprising a crank, a rocking arm having connection with said gear, an operative connection between said crank and rocking arm, and a fixed fulcrum for said rocking arm.

19. In a shaker conveyer operating mechanism, a rotatable crank, a drive member operatively connected thereto and reciprocated thereby, and means for variably rotating said crank in such a manner that said drive member may be gradually accelerated for a greater portion of its forward stroke and rapidly decelerated for the remainder of its forward stroke comprising a gear, a pinion meshing with said gear, a cage carrying said pinion and rotated thereby and means for pivotally moving asid gear in one direction during a portion of the forward stroke and in an opposite direction during the remainder of the forward stroke, comprising a crank, a rocking arm having connection with said gear, an operative connection between said crank and rocking arm, a fixed fulcrum for said rocking arm, and means for changing the movement of said gear and the drive action of said drive member comprising means permitting the fulcrum point of said rocking arm to be changed.

20. In a shaker conveyer operating mechanism, a rotatable crank, a drive member operatively connected thereto and reciprocated thereby, and means for variably rotating said crank in such a manner that said drive member may be gradually accelerated for a greater portion of its forward stroke and rapidly decelerated for the remainder of its forward stroke comprising a gear, a pinion meshing with said gear, a cage carrying said pinion and rotated thereby and means for pivotally moving said gear in one direction during a portion of the forward stroke and in an opposite direction during the remainder of the forward stroke comprising a crank, a rocking arm having connection with said gear, an operative connection between said crank and rocking arm, a fixed fulcrum for said rocking arm, and means for changing the drive motion imparted to said drive member comprising means permitting the fulcrum point of said rocking arm to be changed.

21. In a shaker conveyer operating mechanism, the combination with a reciprocably driven member, of a rotatable crank operatively connected with said reciprocably driven member, and means for imparting a gradually accelerated and rapidly decelerated forward stroke and a rapidly accelerated and gradually decelerated return stroke to said reciprocably driven member comprising a pinion, an internal gear meshed therewith and means for alternately pivotally moving said internal gear in reverse directions during each revolution of said crank.

22. In a shaker conveyer operating mechanism, the combination with a reciprocably driven member, of a rotatable crank operatively connected with said reciprocably driven member, and means for imparting a gradually accelerated and rapidly decelerated forward stroke and a rapidly accelerated and gradually decelerated return stroke to said reciprocably driven member comprising a pinion, an internal gear meshed therewith and means for alternately pivotally moving said internal gear in reverse directions during each revolution of said crank comprising a crank and a connection between said crank and gear.

23. In a shaker conveyer operating mechanism, the combination with a reciprocably driven member, of a rotatable crank operatively connected with said reciprocably driven member, and means for imparting a gradually accelerated and rapidly decelerated forward stroke and a rapidly accelerated and gradually decelerated return stroke to said reciprocably driven member comprising a pinion, an internal gear meshed therewith and means for alternately pivotally moving said internal gear in reverse directions during each revolution of said crank comprising a crank and a connection between said crank and gear including a rocking arm fulcrumed for pivotal movement about a fixed pivotal axis.

24. In a shaker conveyer operating mechanism, the combination with a reciprocably driven member, of a rotatable crank operatively connected with said reciprocably driven member, and means for imparting a gradually accelerated and rapidly decelerated forward stroke and a rapidly accelerated and gradually decelerated return stroke to said reciprocably driven member comprising a pinion, an internal gear meshed therewith, means for alternately pivotally moving said internal gear in reverse directions during each revolution of said crank comprising a crank and a connection between said crank and gear including a rocking arm fulcrumed for pivotal movement about a fixed pivotal axis, having connection with said gear adjacent one of its ends and having connection with said crank intermediate its ends.

25. In a shaker conveyer operating mechanism, the combination with a reciprocably driven member, of a rotatable crank operatively connected with said reciprocably driven member, and means for imparting a gradually accelerated and rapidly decelerated forward stroke and a rapidly accelerated and gradually decelerated return stroke to said reciprocably driven member comprising a pinion, an internal gear meshed therewith, means for alternately pivotally moving said internal gear in reverse directions during each revolution of said crank comprising a fulcrumed rocking arm having connection with said gear, and means for changing the movement of said internal gear and the conveying action of said reciprocably driven member comprising means permitting the fulcrum point of said rocking arm to be changed.

26. In a shaker conveyer drive, a drive shaft, a driven shaft having a crank thereon, planetary drive gearing for rotating said crank with a variable acceleration during each revolution thereof including a reaction member, and means driven at a variable angular velocity for varying the angular velocity of said crank comprising means for reciprocably moving said reaction member during each revolution of said crank, including an oscillating member driven by said driven shaft and a connection from one end of said oscillating member to said reaction member.

27. In a shaker conveyer operating mechanism and in combination with a reciprocably driven conveyer trough, a rotatably driven crank, a connection from said crank to said conveyer trough, and means for driving said crank at a variable angular velocity comprising a gear driven at a uniform angular velocity, a driven member rotatably driven thereby, a reaction member having operative connection with said driven member and a drive connection from said driven member to said crank, and angularly movable means having connection with said reaction member and reciprocably driven by said driven member for moving said reaction member in opposite directions during each revolution of said crank.

28. In a shaker conveyer operating mechanism and in combination with a reciprocably driven conveyer trough, a rotatably driven crank, a connection from said crank to said conveyer trough, and means for driving said crank at a variable angular velocity comprising a gear driven at a uniform angular velocity, another gear driven thereby, a reaction member engaging said second-mentioned gear, means driven at a variable angular velocity for driving said crank from said second-mentioned gear, and angularly movable means having connection with said reaction member and reciprocably driven by said means which drives said crank for reciprocably moving said reaction member during each revolution of said crank.

29. In a shaker conveyer operating mechanism and in combination with a reciprocably driven conveyer trough, a shaft rotatably driven at a variable angular velocity, a drive connection from said shaft to said conveyer trough for reciprocably driving said trough, and means for driving said shaft at a variable angular velocity comprising a gear driven at a uniform angular velocity, another gear meshed therewith, a reaction member meshing with said second-mentioned gear, means coaxial with said first-mentioned gear and shaft for driving said shaft from said second-mentioned gear, and angularly movable means driven from said shaft for reciprocably moving said reaction member during each revolution of said shaft.

30. In a shaker conveyer operating mechanism and in combination with a reciprocably driven conveyer trough, a shaft rotatably driven at a variable angular velocity, a drive connection from said shaft to said conveyer trough for reciprocably driving said trough, and means for driving said shaft at a variable angular velocity comprising a gear driven at a uniform angular velocity, another gear meshed therewith, a reaction member meshing with said second-mentioned gear, means for driving said shaft from said second-mentioned gear, a crank on said shaft, a rocking member having connection with said reaction member for reciprocably moving said reaction member during each revolution of said shaft and a connection from said crank to said rocking member.

WILLIAM W. SLOANE.